Patented Apr. 25, 1933

1,906,149

UNITED STATES PATENT OFFICE

HENRY A. GARDNER, OF WASHINGTON, DISTRICT OF COLUMBIA

DELUSTERING

No Drawing. Original application filed July 1, 1929, Serial No. 375,346. Divided and this application filed February 1, 1932. Serial No. 590,330.

This invention relates to delustering; and it comprises a process of producing opalescence, or a "flat" finish, as the case may be, in fibers, films, varnishes, lacquers, etc., wherein an organosol of a metallic oxid is produced in an organic liquid not a solvent of such oxid, by dissolving an alcoholate of the corresponding metal in said organic liquid and permitting hydrolysis to produce such oxid, the metallic oxid being advantageously $TiO_2$ or $ZrO_2$; the resulting organosol being used in or added to compositions for forming filaments or films; all as more fully hereinafter set forth and as claimed.

The present application is a division of my prior application Serial No. 375,346, filed July 1, 1929. That application is mainly directed to the manufacture of delustered artificial silks. The present application is primarily directed to the making of the organosol compositions irrespective of the subsequent processing of such compositions or the type of articles obtained by such processing.

Most of the materials, the gums, resins, cellulose esters and ethers, etc., used in making films, filaments and varnishes, when dissolved in solvents tend to give transparent and lustrous solutions and the final products are more or less lustrous. Frequently however a silky opalescence to transmitted light or a "flat finish" by reflected light is deemed more desirable. Opacity and, to some extent, flatness can be and are attained by the use of the ordinary fine fillers mixed with the composition, such as barium sulfate or titanium dioxid; but these materials as commercially obtainable are too coarse grained to get the best results from an optical point of view.

It is the object of the present invention to provide a new method of obtaining opalescence or flatness, as the case may be, giving superior results. To this end, I utilize the optical properties of organosols of metallic oxids; producing an extremely fine dispersion of various metallic oxids in solvents employed for making films and filaments by adding to the solvent a hydrolyzable alcoholate of a metal, such alcoholate being soluble in or miscible with the said solvent and the corresponding metal oxid being insoluble in such solvent and permitting hydrolysis therein. The metal alcoholates best adapted for my purposes in giving translucence are those derived from $TiO_2$ and $ZrO_2$, although a multiplicity of other metallic oxids can be used, some of these being hereinafter indicated. While it is ordinarily assumed that neither titanium or zirconium gives alcoholate derivatives, I have found that these can be easily made by processes described post. These metal alcoholates dissolved in organic liquids are sensitive to moisture and can be readily hydrolyzed to give organosols.

Speaking more specifically of titanium compounds, titanium tetrachlorid can be converted into titanium tetraethylate by the action of metallic sodium and ethyl alcohol, sodium ethylate being probably first formed. The sodium chlorid produced is insoluble and can be readily separated from the liquid products of reaction. The new compound produced, titanium tetraethylate, when freed from any excess of alcohol, is a thin, mobile liquid with a boiling point of 200° C. at 156 mm. It can be vacuum distilled to recover it; or it can be left in the alcoholic solution in which it is made. It is soluble in the usual organic solvents, but is readily decomposed in such a solution by even traces of moisture; giving an extremely fine dispersion or organosol of $TiO_2$; probably in hydrated form, or as the so-called titanic acid. Zirconium tetraethylate may be made by a similar method and has similar properties. Zirconium tetraethylate may also be distilled under vacuum. Lower boiling but similar compounds may be made by using methyl alcohol in lieu of ethyl alcohol; and still higher boiling compounds by the use of the higher alcohols, propyl, butyl, pentyl, etc. These alcoholates of titanium and zirconium are soluble in a variety of organic liquids, including alcohol, light petroleum distillates and toluol.

Solutions of any of these alcoholate compounds in absolute alcohol, hydrocarbons, etc., are clear, but on addition of even traces of water, hydrolysis at once occurs with production of insoluble bodies of colloidal fineness in a dispersed condition. According to the quantity of metal alcoholate present, the result may vary from a simple opalescence to the formation of a stiff gel or jelly. Because of the extremely fine particle size in these dispersions, all the sols and gels produced are translucent rather than opaque. For example, by adding 1 cc. of titanium tetraethylate to 10 cc. of a mixture of 95 per cent alcohol and ether, a dense, stiff jelly is formed by the water present in the alcohol. The jelly is however quite translucent, indicating an extreme fineness of subdivision in the $TiO_2$ formed.

The present invention may be utilized in many directions. In making varnishes and lacquers opalescent to transmitted light and flat to reflected light, a small amount of titanium tetraethylate or one of the other alcoholate compounds mentioned may be added to one of the solvents used in making the varnish or lacquer. In making automobile lacquers, for example, opalescent or flat, an ordinary lacquer is mixed with a little titanium tetraethylate, dissolved in alcohol or toluol. Ordinarily, there is enough moisture present in the lacquer to produce the desired organosol. The present invention is even of advantage where the lacquer carries incorporated pigment in amount sufficient to make it opaque, since it destroys the luster of the surface layers of the dry lacquer and gives a flat effect. Similarly, titanium tetraethylate, or one of the other compounds mentioned, may be dissolved in an anhydrous solvent and added to the compositions used in making celluloid articles, nitrocellulose threads (Chardonnet silk), acetylcellulose threads, etc.

I regard the present invention as particularly useful with artificial silk made from either nitrocellulose or acetylcellulose, since it enables the production of a silky opalescence, obviating the high luster of the ordinary threads. An additional advantage is the greater ease of dyeing of the delustered threads, since titanium hydroxid and zirconium hydroxid are excellent mordants; their presence enabling the use of a wide variety of dyes not otherwise applicable to these artificial silks.

The color of the dispersed particles of $TiO_2$ or $ZrO_2$ is white and they give a pearly or silky opalescence; but the particles may be dyed any color, giving a correspondingly tinted opalescence. This may be done by dissolving a basic dye in the alkylate solution. On hydrolysis, the hydroxid particles take up or adsorb the dye.

In a specific embodiment of the present invention, employing titanium tetraethylate to make delustered silk with a silky opalescence, 1 part by volume of liquid titanium tetraethylate was dissolved in 10 parts of absolute alcohol. The solution was mixed with 100 parts of a mixture of ethyl ether and alcohol in the proportion of 60:40, the alcohol being ordinary 95 per cent. A white but translucent jelly formed. Nitrocellulose in the proportion of 25 per cent by weight was added and the mixture stirred until a good solution was obtained. The translucent preparation obtained was forced through capillaries to form threads in the usual method adopted to form artificial silk; the fiber being subsequently denitrated and otherwise processed as usual. The final delustered silk had a translucent, dull appearance like that of natural silk. While I added the titanium tetraethylate to the alcohol-ether before dissolving the nitrocellulose, the nitrocellulose can be as well first dissolved and then the tetraethylate added.

Cellulose acetate silk of dull translucent appearance may be formed in a similar manner. In one particular case, I dissolved about 20 per cent of cellulose acetate in acetone and added up to 10 per cent of an absolute alcohol solution of zirconium tetraethylate. This gave a highly colloidal dispersion of $ZrO_2$ or its hydrate. The translucent solution was used, as before, for making fibers by extrusion.

Cellulose acetate silk and nitrocellulose silk formed in the manner just described both have the silky translucency of natural silk and the general appearance of natural silk. Unique silks may be made by adding a small proportion of a basic dye to the solution of titanium or zirconium tetraethylate. On hydrolysis, the very finely dispersed particles of hydroxid are tinted and the resulting silk has a peculiar tinted opalescence. By the use of a very small amount of a blue dye, a brilliant white opalescence is obtained, this amount of blue dye serving to compensate for the natural yellow of the fiber.

While I have spoken more specifically of titanium and zirconium compounds and while I regard them best adapted for my purposes, a wide variety of other metals forming alcoholate derivatives hydrolyzed by water may be used in their lieu. Aluminum, magnesium and zinc compounds may be mentioned. For special purposes, metals having colored oxids, such as cobalt and nickel, may be used. While cobalt and nickel are not presumed to form direct connected alkyl derivatives, their chlorids, bromids and iodids in alcoholic solution will give di-alcoholate derivatives on treatment with sodium. All of these metals, like titanium and zirconium, give oxids which are normally insoluble in all neutral organic solvents while they form alcoholate compounds which are soluble in these solvents and can be hydrolyzed by minimal amounts of water to give oxids or hydrated oxids insoluble in the organic solvent and in water.

Linseed oil may be used as a dispersion medium by incorporating therein hydrolyzable alkylated compounds of cobalt, manganese, vanadium or lead. Hydrolysis of these compounds causes the formation of organosols of the corresponding metal oxids. The so-treated linseed oil is quick drying owing to the catalytic effect of the metal oxids and gives a desirable flat finish. It may be added to compositions for forming films, that is, coating compositions.

What I claim is:

1. In the delustering and flatting of films, filaments, sheets and layers produced from liquid compositions, the process which comprises adding to the liquid composition a hydrolyzable alcoholate of a metal, said metal being selected from the class consisting of titanium, zirconium, aluminum, magnesium, zinc, cobalt and nickel and effecting hydrolysis of said alcoholate to obtain said delustering and flattening.

2. In the delustering or flatting of varnishes, lacquers, artificial silks, filaments and sheets produced from liquid material, the process which comprises adding to the material a solution of hydrolyzable alcoholate of zirconium.

3. In the delustering of varnishes, lacquers, artificial silks, filaments and sheets produced from liquid material containing a cellulose compound, the process which comprises adding to the liquid material a solution of a hydrolyzable alcoholate of a metal, said metal being selected from a class consisting of titanium, zirconium, aluminum, magnesium, zinc, cobalt and nickel 4. In the delustering of varnishes, lacquers, artificial silks, filaments and sheets produced from liquid material containing a cellulose compound, the process which comprises adding to the liquid material a solution of a hydrolyzable alcoholate of zirconium.

5. In processes of making delustered, colored materials, the steps which comprise admixing a dye with a solution of an alcoholate of a metal, said metal being selected from a class consisting of titanium, zirconium, aluminum, magnesium, zinc, cobalt and nickel and hydrolyzing the said alcoholate in situ, thus dyeing the metallic compounds, produced by said hydrolysis, with said dye.

6. In processes of delustering and flattening varnishes and the like produced from liquid materials, the process which comprises adding to the liquid material, a solution of a hydrolyzable alcoholate of a metal, said metal being selected from a class consisting of titanium, zirconium, aluminum, magnesium, zinc, cobalt and nickel, and hydrolyzing, in situ, the said alcoholate.

7. In processes of delustering and flattening varnishes and the like produced from liquid material, the steps which comprise adding to linseed oil, an alcoholate of a metal, said metal being selected from the class consisting of titanium, zirconium, aluminum, magnesium, zinc, cobalt and nickel, and hydrolyzing in situ the said alcoholate.

8. In the manufacture of delustered and flattened films, filaments, sheets, layers and the like from liquid compositions containing an organic liquid component, the improvement which comprises forming an organosol of a metallic oxid in situ in an organic liquid component of said compositions by hydrolyzing a metal alcoholate contained in said liquid component, said metallic oxid being insoluble in said liquid composition and said metal alcoholate being soluble in or miscible with said liquid component and capable of producing a metallic oxid insoluble in said liquid component and in water when so hydrolyzed.

In testimony whereof, I have hereunto affixed my signature.

HENRY A. GARDNER.